United States Patent
Sainath

(10) Patent No.: US 8,898,118 B2
(45) Date of Patent: Nov. 25, 2014

(54) EFFICIENCY OF COMPRESSION OF DATA PAGES

(71) Applicant: International Business Machines Corporation, Armonk, NY (US)

(72) Inventor: Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 13/689,995

(22) Filed: Nov. 30, 2012

(65) Prior Publication Data

US 2014/0156608 A1    Jun. 5, 2014

(51) Int. Cl.
G06F 17/30    (2006.01)

(52) U.S. Cl.
CPC ................................. *G06F 17/30153* (2013.01)
USPC .......................................... 707/687; 707/693

(58) Field of Classification Search
USPC ................................................ 707/687, 693
See application file for complete search history.

(56) References Cited

U.S. PATENT DOCUMENTS

| | | | | |
|---|---|---|---|---|
| 5,666,560 | A * | 9/1997 | Moertl et al. .................... | 710/68 |
| 7,813,565 | B2 * | 10/2010 | Harada et al. .................. | 382/232 |
| 7,904,432 | B2 * | 3/2011 | McKay et al. ................. | 707/693 |
| 7,984,026 | B2 | 7/2011 | Iitsuka | |
| 8,037,255 | B2 * | 10/2011 | Jeong et al. .................... | 711/154 |
| 8,291,189 | B2 * | 10/2012 | Shiga ............................ | 711/170 |
| 8,560,926 | B2 * | 10/2013 | Yeh ............................... | 714/773 |
| 2009/0063528 | A1 | 3/2009 | Yueh | |
| 2009/0204636 | A1 | 8/2009 | Li et al. | |
| 2010/0125553 | A1 | 5/2010 | Huang et al. | |
| 2010/0161567 | A1 * | 6/2010 | Makela ......................... | 707/693 |
| 2011/0055471 | A1 | 3/2011 | Thatcher et al. | |
| 2011/0093439 | A1 | 4/2011 | Guo et al. | |
| 2011/0125722 | A1 | 5/2011 | Rao et al. | |
| 2011/0145207 | A1 | 6/2011 | Agrawal et al. | |
| 2012/0109908 | A1 * | 5/2012 | Barsness et al. .............. | 707/693 |
| 2012/0124016 | A1 * | 5/2012 | Barsness et al. .............. | 707/693 |

OTHER PUBLICATIONS

International Business Machines Corporation, Power Systems Memory De-Duplication, International Technical Support Organization, Feb. 2012.

* cited by examiner

*Primary Examiner* — Kim Nguyen
(74) *Attorney, Agent, or Firm* — Yudell Isidore PLLC; Parashos Kalaitzis

(57) ABSTRACT

A system includes a processor executing code to compress a first page of data stored in memory and calculate an effectiveness of the compression on the first page. The processor further, in response to the calculated compression effectiveness being at least equal to a pre-determined/pre-established compression effectiveness threshold: identifies second pages of data from memory that have similarities in content with the first page; and sequentially performs subsequent compressions of second pages from among the plurality of second pages in an order that is based on a relative ranking of the plurality of second pages. The ranking of the second pages is according to a calculated differential parameter associated with each of the second pages, which indicates a level of similarity that exists between the first page and a corresponding second page. Higher ranked second pages are compressed ahead of lower rank second pages, yielding greater compression efficiency.

20 Claims, 6 Drawing Sheets

EFFICIENCY OF COMPRESSION OF DATA PAGES

BACKGROUND

1. Technical Field

The present invention generally relates to data processing and in particular to improving the efficiency of data compression for pages of data with similar content.

2. Description of the Related Art

Data processing systems often include features that manage optimization of data storage in system memory devices. Often times, memory management systems will compress stored data in order to optimize available storage. One method of memory management is data de-duplication. Data de-duplication involves identifying identical chunks of data and eliminating duplicate copies.

BRIEF SUMMARY

Aspects of the described embodiments provide a system and a computer program product that implement efficient data compression for pages of data having similar content. The system includes a processor executing code that configures the processor to: compress a first page of data stored in a memory and calculate a compression effectiveness indicating an amount by which the first page was compressed. The code further configures the processor to, in response to the calculated compression effectiveness being at least as high as a pre-determined compression effectiveness threshold: identify a plurality of second pages of data stored in the memory that have similarities in content with the first page; and sequentially perform subsequent compressions of one or more second pages from among the plurality of second pages in an order that is based on a relative ranking of the plurality of second pages according to a differential parameter associated with each of the plurality of second pages that indicates a level of similarity that exists between the first page and a corresponding one of the plurality of second pages.

According to one embodiment, the code further configures the processor to: rank each of the plurality of second pages according to a differential parameter value that indicates a relative similarity between the contents of each of the plurality of second pages and the first page; and generate one or more differential mappings comprising stored differential values of pairs of compared pages, where a differential mapping is a data structure indicating a differential value for each page of data in the memory compared to every other page of data in the memory. According to this embodiment, the processor performs the identifying of the plurality of second pages utilizing the differential mapping.

With the data processing system implementation, the system includes a processor, a memory, and computer readable code that enables a processor and/or a hypervisor and/or a compression accelerator to perform the above processes when the code is executed on the respective processing device. Finally, the computer program product implementation comprises a computer readable storage device that includes computer readable code which, when executed by a processor, configures the processor to perform the above described processes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein.

DETAILED DESCRIPTION

Figure 1:
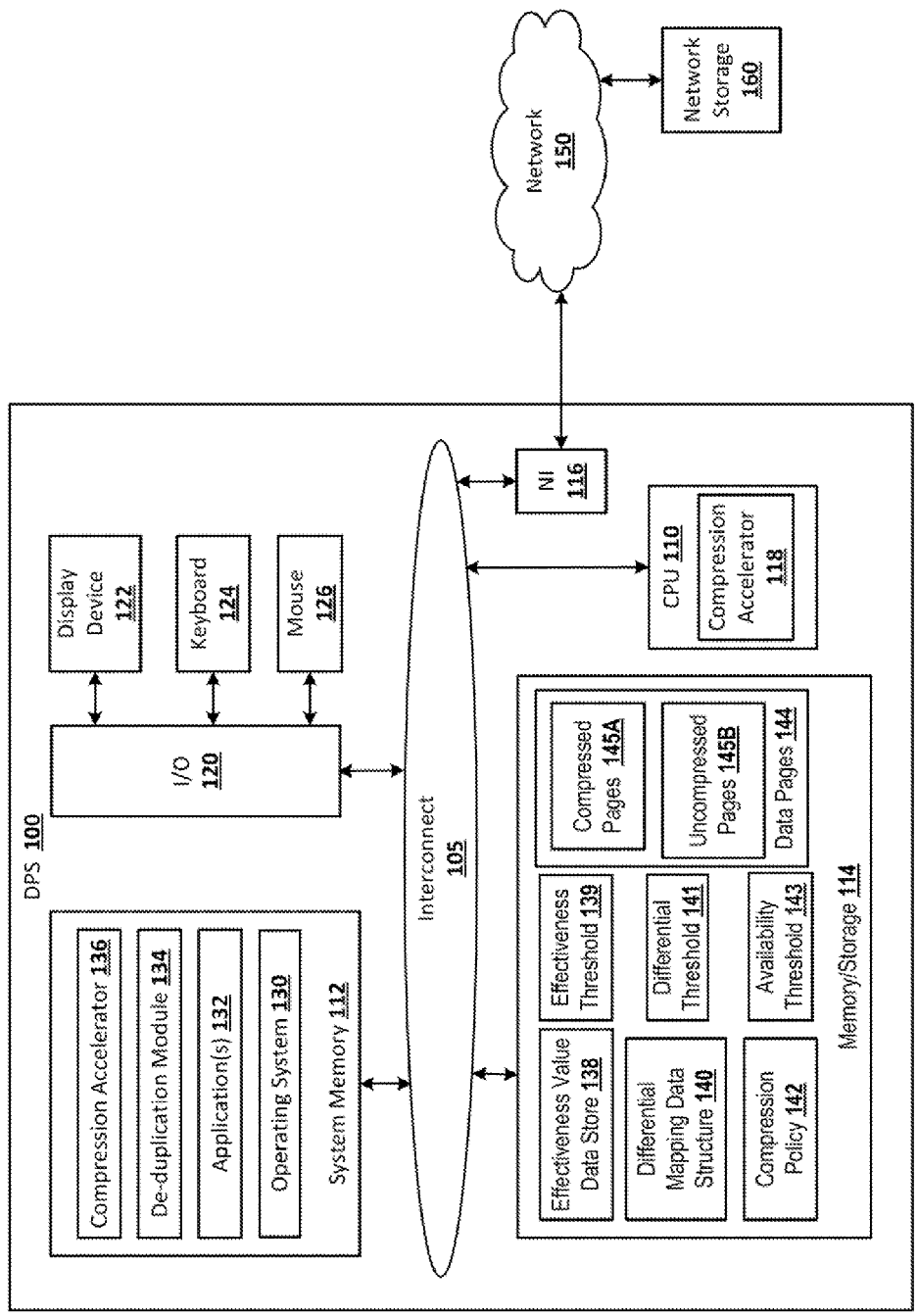
FIG. 1 provides a block diagram representation of an illustrative networked data processing system within which the features of the disclosure can be practiced, according to one embodiment.

The illustrative embodiments provide a method, system and computer program product for data compression. Briefly, a data processing system compresses a first page of data in a memory device and calculates the effectiveness of the compression of the first page. In response to the calculated compression effectiveness being at least as high as a pre-determined/pre-set compression effectiveness threshold, the data processing system identifies a plurality of second pages of data stored in the memory that have similarities in content with the first page. The data processing system then sequentially performs subsequent compressions of one or more second pages from among the plurality of second pages in an order that is based on a relative ranking of the plurality of second pages. The relative ranking is determined according to a differential parameter associated with each of the plurality of second pages that indicates a level of similarity that exists between the first page and a corresponding one of the plurality of second pages. Higher ranked second pages are compressed ahead of lower rank second pages.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions (or code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a computer readable storage device that can direct a computer, other programmable data processing apparatus, or other devices to function in a particular manner, such that the instructions stored in the computer readable storage device produce an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components, devices, or parameters herein, without limitation. Each term utilized herein is to be given its broadest interpretation given the context in which that terms is utilized. As utilized herein, the term data and page of data and content are referred to interchangeably, and data generally refers to any content that is stored on a page of memory that can be individually compressed.

Finally, it should be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

With reference now to the figures, and beginning with FIG. 1, there is depicted a block diagram representation of an illustrative data processing system (DPS) 100 connected to network storage 160 across a network 150. DPS 100 is an example of a processing device within which various aspects of the embodiments of the disclosure presented herein can be implemented. DPS 100 includes numerous components physically connected and/or logically interconnected by an interconnect 105. Specifically, as provided by FIG. 1, DPS 100 includes a processor or central processing unit (CPU) 110, a system memory 112, additional memory/storage 114, network interface (NI) 116, and input/output (I/O) controller 120. Each component is connected via the interconnect 105. NI 116 enables the connection of DPS 100 to one or more other devices, such as network storage 160 across a network 150. I/O controller 120 allows a user to interface with DPS 100 via one or more I/O devices, such as display device 122, keyboard 124, and mouse 126.

As presented herein, CPU 110 can be any kind of hardware processor or plurality of processors. Also, CPU 110 can be physically located on a processor chip. As shown by the example figure, and according to one embodiment (which embodiment can be referred to herein as a hardware embodiment or hardware implementation), CPU 110 and specifically the processor chip on which CPU 110 is fabricated includes thereon a hardware compression accelerator 116. As described in greater details below, compression accelerator 116 performs data compression (of stored content). According to one aspect of this configuration, compression accelerator 116 operates independent of CPU 110 such that the compression functions of DPS 100 can be completed without utilizing processor cycles.

System memory 112 can be random access memory (RAM), cache memory, flash memory, or any other kind of storage structure or storage device that is configured to store computer instructions/code executable by CPU 116 and/or to store data utilized during CPU execution of program code. As depicted, system memory 112 includes operating system 130. Operating system 130 may be any platform that manages the execution of computer code and manages hardware resources. For example, operating system 130 may be the Advanced Interactive Executive (AIX®) operating system, the LINUX® operating system, or any other operating system known in the art. AIX® is a registered trademark of International Business Machines Corporation, and LINUX® is a registered trademark of Linus Torvalds.

System memory 112 also includes one or more applications 132 and a plurality of functional modules, including de-duplication module 134 and compression accelerator 136. For purposes of clarity of this description, applications 132, as well as compression accelerator 136 and de-duplication module 134, are computer programs or applications embodied in memory 112 as executable computer code which can be executed by CPU 116 to perform various aspects of the features described herein.

DPS 100 also includes memory/storage 114, which can be an extension of system memory 112 or a stand-alone or separate storage device that stores individual blocks or pages of data. Memory/Storage 114 is referred to hereinafter as memory device 114 for simplicity, but the functionality described herein as being performed with memory pages and/or pages of memory data are understood to be applicable to one or more of separate memory, system memory, or general storage devices within DPS 100 and/or connected to DPS 100, such as network storage 160. Memory device 114 may be random access memory (RAM), a hard disk, cache memory, flash memory, or any other kind of storage structure or storage device, whether volatile or non-volatile. As depicted, memory device 114 is part of DPS 100. However, in one or more embodiments, memory device 114 may be located alternatively, or additionally, across network 150 in a separate data processing device (not shown) and/or network storage 160.

In one or more embodiments, memory device 114 can include one or more of effectiveness value data store 138, differential mapping data structure 140, and compression policy 142. Respectively associated with each of these components and stored/maintained within memory device 114 are effectiveness threshold 139, differential threshold 141, and storage space availability threshold 143. In alternate embodiments, one or more of these components illustrated within memory device 114 may be stored in system memory 112 within DPS 106 and/or within network storage 160. Memory device 114 also includes data pages 144, which includes a combination of compressed pages 145A and uncompressed pages 145B. It is appreciated that data pages 144 can at times include only compressed pages 145A or only uncompressed pages 145B.

In one or more embodiments, effectiveness value data store 138 includes data identifying the effectiveness of the compression of each compressed page, or chunk, of data in compressed pages 144A. The effectiveness value for each compressed page (i.e., the compression effectiveness) may be calculated in any of a variety of ways. For example, in one embodiment, the effectiveness value may be a measurement of the total reduced amount of memory required to store the compressed page instead of the uncompressed page. In another embodiment, the effectiveness value may be measured in the form of a ratio of (a) the difference between the original page size and the compressed page size to (b) the original page size. In one or more embodiments, effectiveness values are calculated and stored dynamically as memory pages of uncompressed data 145B are compressed.

In one or more embodiments, differential mapping data structure 140 includes differential values indicating the relative similarity between two pages, or chunks, of data in compressed/uncompressed data 144. Differential values may be calculated using a variety of methods. For example, in one embodiment, differential values are calculated as a sum of the amount of used memory space that contains identical content between two pages of data. In another embodiment, differential values may be calculated as a percentage of data that is the same, or different, in any two pages of memory. In one or more embodiments, differential values can be stored for each pair of memory pages in data pages 144. Alternatively, in one or more embodiments, differential values can be stored for each compressed memory page 145A within data pages 144 compared to each other page, or only to each uncompressed page 145B within data pages 144. In one or more embodiments, differential values may be calculated dynamically as uncompressed memory pages 145B of data pages 144 are compressed or new uncompressed pages (not shown) are added to memory device 114.

In one or more embodiments, compression policy 142 includes data and/or information that indicates what criteria should be used to determine (a) when pages within memory device 114 are to be compressed and (b) which pages of uncompressed data 145B to compress. In one or more embodiments, compression policy 140 includes a threshold value for compression effectiveness (effectiveness threshold 139) that indicates at what measure of compression a page has been sufficiently compressed such that other similar pages should also be compressed. In one or more embodiments, compression policy 140 can also include differential threshold 141 that indicates at what measurement of relative similarity a uncompressed page must be when compared to a compressed page to declare the two pages sufficiently similar for inclusion in a differential mapping (140). One aspect of the disclosure is that pages that are the same or substantially similar should have the same compression effectiveness. As such, once a compressed page is determined to have compression effectiveness at or above the effectiveness threshold 139, a similar page (i.e., having substantial or 100% overlap in content) is assumed to also have similar compression effectiveness and can therefore be successfully compressed. The compression of these similar pages then aid in increasing the amount of memory space available within the memory device 114, in a more efficient manner than arbitrarily compressing pages. Accordingly, uncompressed second pages should be compressed only if the compressed first page yields a compression effectiveness that meets or exceeds the effectiveness threshold 139.

In one embodiment, the effectiveness threshold 139 and the differential threshold 141 can be predefined. Also, in one or more embodiments, the effectiveness threshold 139 and the differential threshold 141 may be dynamically modified based on system properties. For example, in one or more embodiments, one or both of the effectiveness threshold 139 and the differential threshold 141 may be dynamically modified based on a total amount, or a percentage amount, of available memory in memory device 128. In one embodiment, when the amount of available memory in memory device 114 goes above or below an availability threshold 143 (which may be stored, for example, in compression policy 142), then the effectiveness threshold 139 and/or differential threshold 141 may be increased or decreased. For example, if memory device 114 has substantial storage availability, then the effectiveness threshold 139 and/or differential threshold 141 may be modified such that fewer pages are compressed and/or identified as being similar to a compressed page. Alternatively, if memory device 128 has limited availability, then the effectiveness threshold 139 and/or differential threshold 141 may be modified such that more pages are compressed and/or more identified as being similar to a compressed page. Specifically, one embodiment provides for changing a value of at least one of the pre-set differential parameter threshold and the pre-determined compression effectiveness threshold based on an amount of available memory, where the value of the differential parameter threshold and/or the value of the pre-determined compression effectiveness threshold can be decreased in response to the amount of available memory being reduced and can be increased in response to the amount of available memory increasing.

Revisiting the components from system memory 112, according to one or more embodiments de-duplication module 134 includes computer code which, when executed by CPU 116, (1) calculates differential values indicating the relative similarity between two pages, or chunks, of data in data store 144 within memory 114 and (2) ranks and stores the calculated differential values in differential mapping data structure 140. In one or more embodiments, de-duplication module 134 also identifies and purges redundant memory pages stored in memory device 114 based on considerations of low storage availability. As described herein, de-duplication module 134 calculates differential values, for example, as a sum of the amount of memory that is identical between two pages of data or as a percentage of data that is the same, or different, in any two pages of memory. In addition, de-duplication module 134 can calculate and store differential values dynamically, for example, as memory pages are compressed in memory 114 or as new data (e.g., a new page of data) is stored in memory 114. New data may be stored in memory 114, for example, as a result of application(s) 132 executing by CPU 116 generating the new data.

In one or more embodiments, compression accelerator 136 is software code that executes on CPU 105 to provide the compression features described herein as being performed by hardware compression accelerator 116. Within the description of the disclosure, the underlying functionality performed by the two alternate implementations of the compression accelerator is the same, regardless of whether implemented as hardware compression accelerator 116 or software-enabled accelerator 136. For simplicity in describing the disclosure, reference is made to hardware compression accelerator 116, described simply as compression accelerator 116. Compression accelerator 116 determines/identifies/selects which uncompressed memory pages in memory device 128 should be compressed and performs the compression of the determined uncompressed pages. In one or more embodiments, compression accelerator 136 compresses an uncompressed first page of data from within memory 114 and then identifies uncompressed second pages of data within memory that have similar content or having similarities in content with the first page. Compression accelerator then compresses one or more of the second pages, based on a ranking of how similar the second pages of data are to the first page. In one or more embodiment, compression accelerator 116 can select the first pages of data stored in memory 114 at random. Alternatively, in other embodiments, compression accelerator 116 selects the first page by utilizing data generated by de-duplication module 134 to determine which pages have similar pages identified that can be compressed. Additionally, compression accelerator 116 calculates effectiveness values indicating the effectiveness of the compression performed on a page and utilizes that effectiveness value to determine (from differential mapping data structure 140) which other uncompressed page to select as the second page for compression.

Compression accelerator 136 utilizes an effectiveness threshold 139, which indicates at what measure of compression a page has been sufficiently compressed such that other similar pages should also be compressed. If a particular memory page is compressed and the subsequent effectiveness value of the particular page satisfies the effectiveness threshold 141, then compression accelerator 116 accesses differential mapping data structure 140 to determine if any of the other memory pages in memory device 128 have a differential value that satisfies the differential threshold 141 of compression policy store 142 when compared to the particular compressed page. If any other pages relative to the particular page have a differential value that meets the differential threshold 141, then compression accelerator 116 selects a highest ranked page from among those other pages to be compressed next. The pages can then be compressed in sequence based on the relative rankings of their differential values. In one or more embodiments, compression accelerator 116 additionally triggers the de-duplication module 134 to calculate effectiveness values for the newly compressed pages. Further, in one or more embodiments, compression accelerator 116 and de-duplication module 134 can execute concurrently and/or in parallel.

Figure 2:
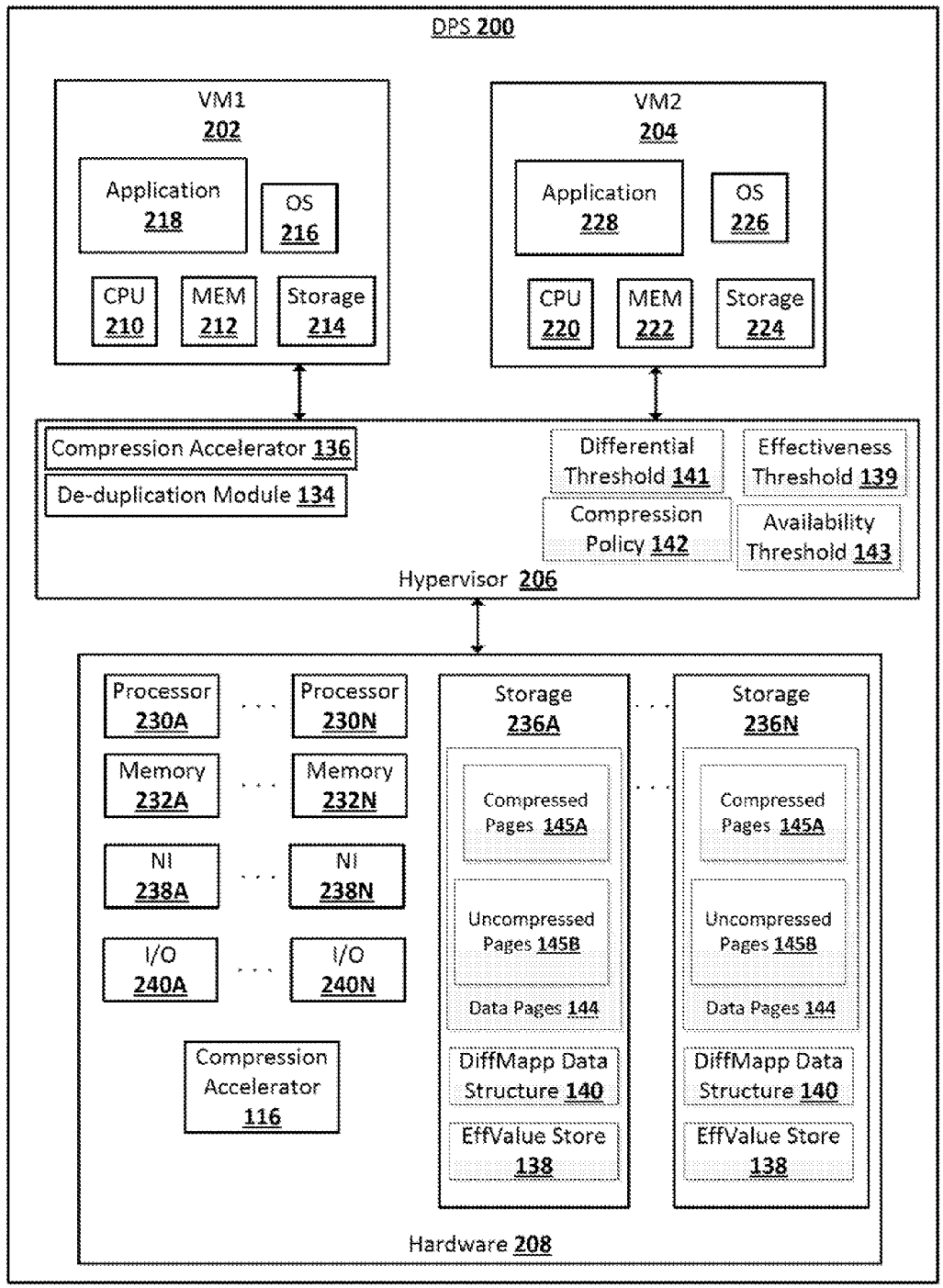
FIG. 2 provides a detailed block diagram representation of an illustrative virtualized data processing system within which the features of the disclosure can also be practiced, according to one embodiment.

Turning now to FIG. 2, various aspects of the disclosure can be advantageously applied and/or implemented within a virtualized data processing system environment, such as presented with FIG. 2. Virtualized DPS architecture 200 is illustrated having two virtual machines, VM1 202 and VM2 204. For simplicity in describing the functional makeup of these virtual machines, each of VM1 202 and VM2 204 are configured to be similar to DPS 100, including in particular the various functional software modules and accessible memory devices in which pages of compressed and uncompressed data are stored. However, unlike with DPS 100, the functional aspects of the disclosure can be performed by hypervisor 206, which provides and maintains the specific allocation to each virtual machine of required hardware resources within hardware layer 208. These shared hardware resource includes processors 230, memory 232, storage 236, network interface (NI) 238, and I/O 240. As shown, VM1 202 includes CPU 210, memory 212, and storage 216, while VM2 202 includes CPU 220, memory 222, and storage 224. It is appreciated that each VM can further include specific allocations of NIs 238 and I/Os 240. According to one aspect of the disclosure, hardware layer 208 can also include a hardware compression accelerator 116 that can be allocated as a resource to either the individual virtual machines or to hypervisor 206 in order to perform the required compression features and/or functions described herein. It is appreciated that compression accelerator 116 can be physically located on processor chip of processor 230.

In virtualized DPS architecture 200, hypervisor 206 is logically located above hardware layer 208. Hypervisor 206 is a virtualization management component that partitions resources in hardware layer 208 to create logical partitions. In addition, Hypervisor 206 is configured to manage VM1 202 and the logical partitions of hardware resources made available to VM1 202, as well as VM2 204 and the logical partitions of hardware resources made available to VM2 204. To complete the various functions described herein, hypervisor 206 can include compression policy 142 and parameters such as effectiveness threshold 139, differential threshold 141, and availability threshold 143.

In addition to the hardware allocations, VM1 202 also includes an instance of Operating System (O/S) 216, as well as applications 220. VM1 202 and the logical partitions of hardware components associated therewith provide a virtual execution environment for computer code. Specifically, as depicted, VM1 202 can provide an execution environment to execute application 220. VM2 230 includes an instance of Operating System 226 and Application 228. In one or more embodiments, OS 218 and OS 238 may be separate instances of a same operating system.

In one or more embodiments, compression accelerator 136 and de-duplication module 134 reside within Hypervisor 206. The respective functionalities of these components have been previously described with reference to FIG. 1. As further illustrated, storage 236 can include effectiveness value data store 138, differential mapping data structure 140, and data pages 144. In one or more embodiments, de-duplication module 134 identifies and purges redundant memory pages stored in memory 232 and/or storage 236. Redundant pages may occur, for example, when VM1 202 and VM2 204 both store the same data in their respective storage allocations, resulting in redundant data being stored in storage 236.

Those of ordinary skill in the art will appreciate that the hardware components and basic configuration depicted in FIGS. 1 and 2 may vary. The illustrative components within DPS 100 and virtualized DPS architecture 200 are not intended to be exhaustive, but rather are representative to highlight components that can be utilized to implement the present disclosure. For example, other devices/components may be used in addition to or in place of the hardware depicted. The depicted example is not meant to imply architectural or other limitations with respect to the presently described embodiments and/or the general disclosure. The data processing system depicted in FIG. 1 and/or FIG. 2 may be, for example, IBM Power Systems, a product of International Business Machines Corporation in Armonk, N.Y., running the Advanced Interactive Executive (AIX) operating system or LINUX operating system.

Figure 3:
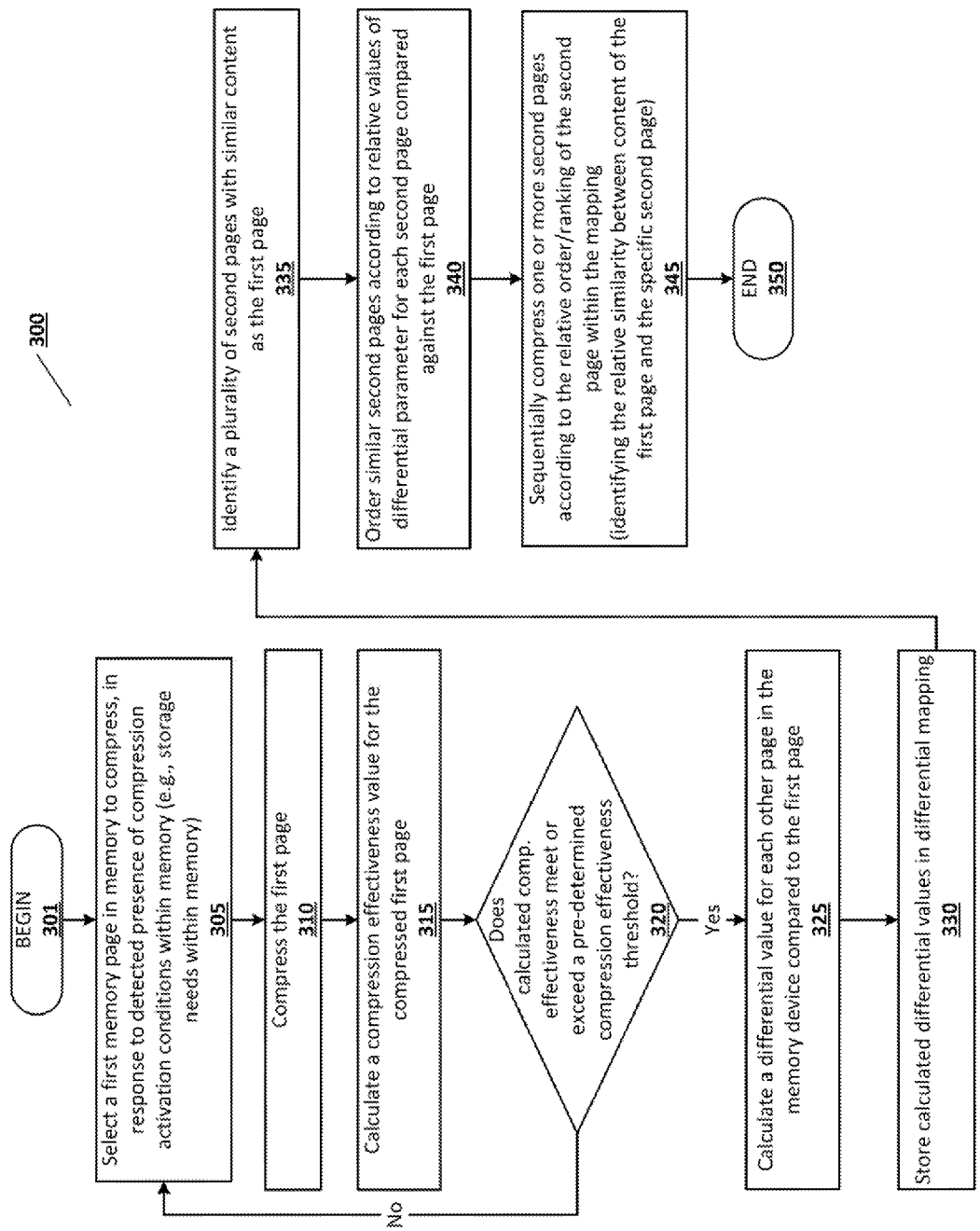
FIG. 3 is a flow chart illustrating a general method for implementing efficient sequencing of data compression of memory pages, according to one or more embodiments of the disclosure.

FIG. 3 is a flow chart illustrating a method 300 by which the selective data compression of pages of data is implemented for maximum compression efficiency, according to one or more embodiments. Specifically, FIG. 3 illustrates a method, which can be implemented by execution of program code of the various modules in memory 112 (FIG. 1) by CPU 110, to compress specific uncompressed pages of data within memory device 114, determine similarities between pages stored on memory device 114, and selectively compressed additional pages of data based on a ranking of their relative similarities to each other and/or to a compressed page. Certain aspects of the method 300 involve accessing and/or updating compression policy 142 based on availability threshold. In the following flowcharts, reference will be made to modules and devices presented in FIG. 1; However, it is appreciated that the processes described can also be implemented within virtualized DPS architecture 200 as presented in FIG. 2, utilizing the modules and devices illustrated therein. Further, the functions can also be implemented within other configurations of processing systems, and those configurations presented are done solely for illustration of one or more possible embodiments.

The method begins at start block 300. At block 305, compression accelerator 116 selects a first page in memory to compress. According to the illustrative embodiment, compression accelerator 116 is triggered to initiate memory page compression in response to detection of one or more compression activation conditions within the system and/or the memory. For example, in one embodiment, a compression activation condition can be a decline in the amount of available memory storage below an availability threshold 143 (e.g., less than 5 Gigabytes of memory space remaining or less than 15% of memory space remaining) In another embodiment, the compression activation condition can be expiration of a pre-set timeout period (e.g., 24 hours or 10,000 processor cycles) after which uncompressed memory pages are screened for compression. In yet another embodiment, the compression activation condition can be triggered by the presence of a large number of similar pages within the memory device, as determined by execution of an extended de-duplication process that involves page similarity analysis and mapping of similar pages within a differential mapping data structure 140. Method proceeds to block 310 at which compression accelerator 116 compresses the selected first page of data stored in memory. At block 315, compression accelerator 116 calculates a compression effectiveness for the compressed first page, which indicates an amount (e.g., absolute number of storage bytes or percentage) by which the first page was compressed. As described above, the compression effectiveness may be calculated, for example, as a total amount of memory saved by the compression, which includes calculating a ratio of (a) a difference between an original size of the first page and a compressed size of the first page to (b) the original size of the first page. Method 300 proceeds to decision block 320 at which compression accelerator compares the calculated compression effectiveness with a pre-set or pre-determined compression effectiveness threshold and determines whether the calculated compression effectiveness meets or exceeds the effectiveness threshold. As an example, the determination can include determining whether the calculated effectiveness value indicates that the compression of the page achieve a greater compression than the minimum acceptable compression established by the effectiveness threshold. Notably, if the calculated effectiveness is not at or above the effectiveness threshold, method 300 includes selecting another uncompressed page as the first page, and this process may continue until all uncompressed pages are check or a certain number of uncompressed pages are checked. In one or more embodiments, the compression accelerator 116 accesses the effectiveness threshold 139 from compression policy 142. In one or more alternate embodiments, the effectiveness threshold can be a value below which a memory page is determined to have been compressed sufficiently to compress other similar pages.

Method 300 further includes, in response to the calculated compression effectiveness being at least as high as the pre-determined compression effectiveness threshold, triggering execution of de-duplication module 134 to perform the functions of: calculating a differential value for each other uncompressed page in the memory compared to the first page (block 325); storing the calculated differential values in a differential mapping data structure 140 (block 330); identifying a plurality of second pages of data stored in the memory that have similarities in content with the first page (block 335); and ordering and/or ranking the similar pages according to their differential parameter values relative to the first page (block 340).

With the uncompressed second pages rank based on relative similarity to compressed first page, method 300 further includes compression accelerator 136 sequentially performing subsequent compressions of one or more uncompressed second pages from among the plurality of second pages in an order that is based on a relative ranking of the plurality of second pages according to the differential parameter associated with each of the plurality of second pages (block 345). As presented, the differential parameter of each second page indicates a level of similarity that exists between the first page and a corresponding second page among the plurality of second pages. Method 300 then ends at block 350.

According to one embodiment, compression accelerator 116 can be configured to determine whether any of the calculated differential values satisfies a differential threshold, which can be retrieved from compression policy 142, in one implementation. If compression accelerator 116 determines that none of the calculated differential values corresponding to the memory page compressed at block 305 satisfy the differential threshold, then no subsequent compression (i.e., automatic continuing of a next compression based on the successful compression of the first page) is performed on any of the second pages, as the second pages are determined to not be sufficiently similar in content to predict whether the subsequent compression would be successful or effective (i.e., pass the effectiveness threshold). With this embodiment, compression accelerator 136 identifies the second pages corresponding to the differential values that satisfy the differential threshold. These second pages are thus determined to be sufficiently similar to the first page such that, when compressed, would yield effectiveness values that meet or exceed the effectiveness threshold. Compression accelerator 136 then compresses these second pages in sequence based on their relative differential values.

Figure 4:
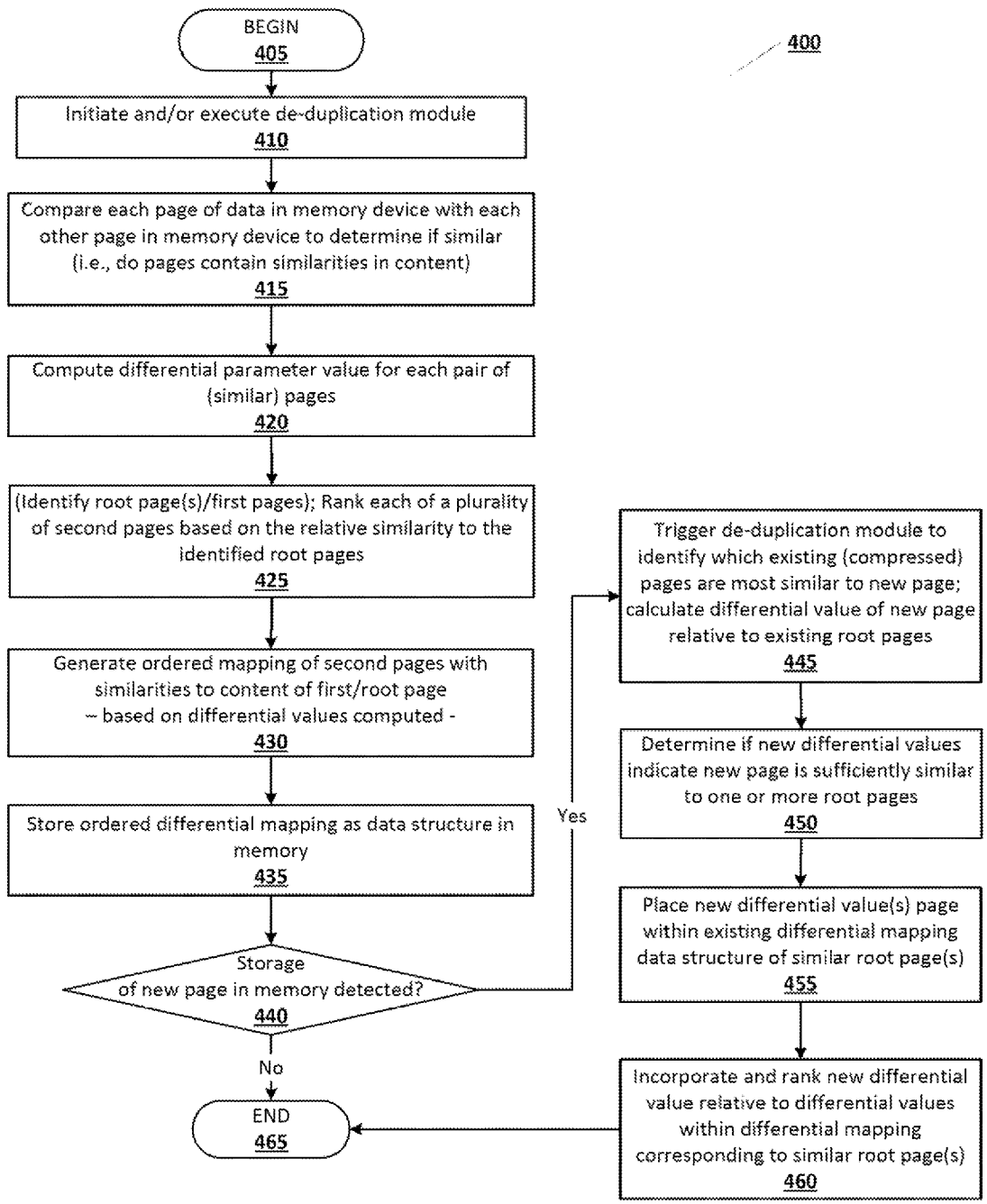
FIG. 4 is a flow chart illustrating a method for generating a differential mapping of similar memory pages, according to one or more embodiments.

Turning now to FIG. 4, method 400 presents the processing by which the pages within memory device 114 and new pages added to memory 114 are compared for similarities and ranked based on the determined similarities, if any. Method 400 begins at block 405 and proceeds to block 410 at which de-duplication module 134 is executed by processor 110 (or hypervisor 206) to identify and map the plurality of pages in memory 114 with similarities in content. Method 400 includes de-duplication module 134 comparing each page of data within the memory with each other page to determine if the respective content of the two pages being compared are similar (block 415). Method further includes de-duplication module 134, in response to identifying similar pages of data, computing a differential parameter value for each of the two pages having similar content (block 420). According to one embodiment, de-duplication module 134 can then identify one or more root page(s), such as the first page, for use in developing the mapping of relative differential values. At block 425, method 400 includes de-duplication module 134 ranking each of the plurality of second pages according to a differential parameter value that indicates a relative similarity between the contents of each of the plurality of second pages and the first page. Method 400 also includes de-duplication module 134 generating and maintaining an ordered mapping of the plurality of pages that have similarities in content with the first page (or root page), where the plurality of pages are arranged sequentially according to a relative size of the differential parameter value computed for each page when compared against the first page (block 430). According to one embodiment, this process can include generating at least one differential mapping comprising stored differential values of pairs of compared pages. The differential mapping is a data structure which indicates a differential value for each page of data in the memory compared to every other page of data in the memory.

Method further includes de-duplication module storing the mapping as a differential mapping data structure 140 within the memory 114 (block 435). During the processing of FIG. 3, method 300 would then include accessing the mapping to determine an order of selecting the one or more second pages on which to perform the subsequent compression. Accordingly, method 300 provides for performing the identifying of the plurality of second pages utilizing the differential mapping data structure 140.

With the previously stored pages mapped within the data structure 140, method includes compression accelerator 116 and/or de-duplication module 134 detecting at block 440 storage of a new page to memory 114. In response to detecting the storage of the new page of data, de-duplication module is trigger to: calculate new differential values for the new page of data compared to previously compressed pages of data (block 445); determine whether any of the new differential values indicates that the new page of data is sufficiently similar to a compressed page (block 450); and place the new page of data as one of the plurality of second pages within a differential mapping corresponding to the compressed page (block 455). Method 400 further includes de-duplication module incorporating the new page of data ranked/ordered in correct sequence within the differential mapping based on the new differential value relative to the existing differential values of the plurality of second pages (block 460).

According to one embodiment, the method processes for determining similarities in pages are triggered and/or initiated by a selection of the first page for compression and is thus performed specifically for each second page based on that first page selection. The method then provides the functions of: calculating a differential parameter value indicating a relative similarity between the content of the first page and the content of the second page; determining whether the differential parameter value is not greater than a pre-set differential parameter threshold that indicates a minimum level of similarity between any two pages that is sufficient to mark the two pages as similar; and in response to determining that the differential parameter value is not greater than the differential parameter threshold, tagging the second page of data as being similar to the first page. The method then also includes: performing the identifying, calculating, and determining for each second page of data stored in memory; tagging, as similar, only those second pages of data having a differential parameter value that is not greater than the differential parameter threshold; and ordering the second pages that are tagged as being similar within a mapping that provides the plurality of second pages arranged in sequence of relative size of a respective differential parameter value for each of the plurality of second pages.

According to one aspect of the above embodiment, the pre-determined compression effectiveness threshold is indicative of a specific desired minimum value of compression effectiveness, and the method further comprises: comparing the calculated compression effectiveness against the pre-determined compression effectiveness threshold; and in response to the calculated compression effectiveness being at least as high as the compression effectiveness threshold: retrieving the mapping; selecting at least one second page having a lowest differential parameter value; performing a first subsequent compression on the selected at least one second page; and performing each other subsequent compression on second pages selected in sequence based on the order within the mapping.

Figure 5:
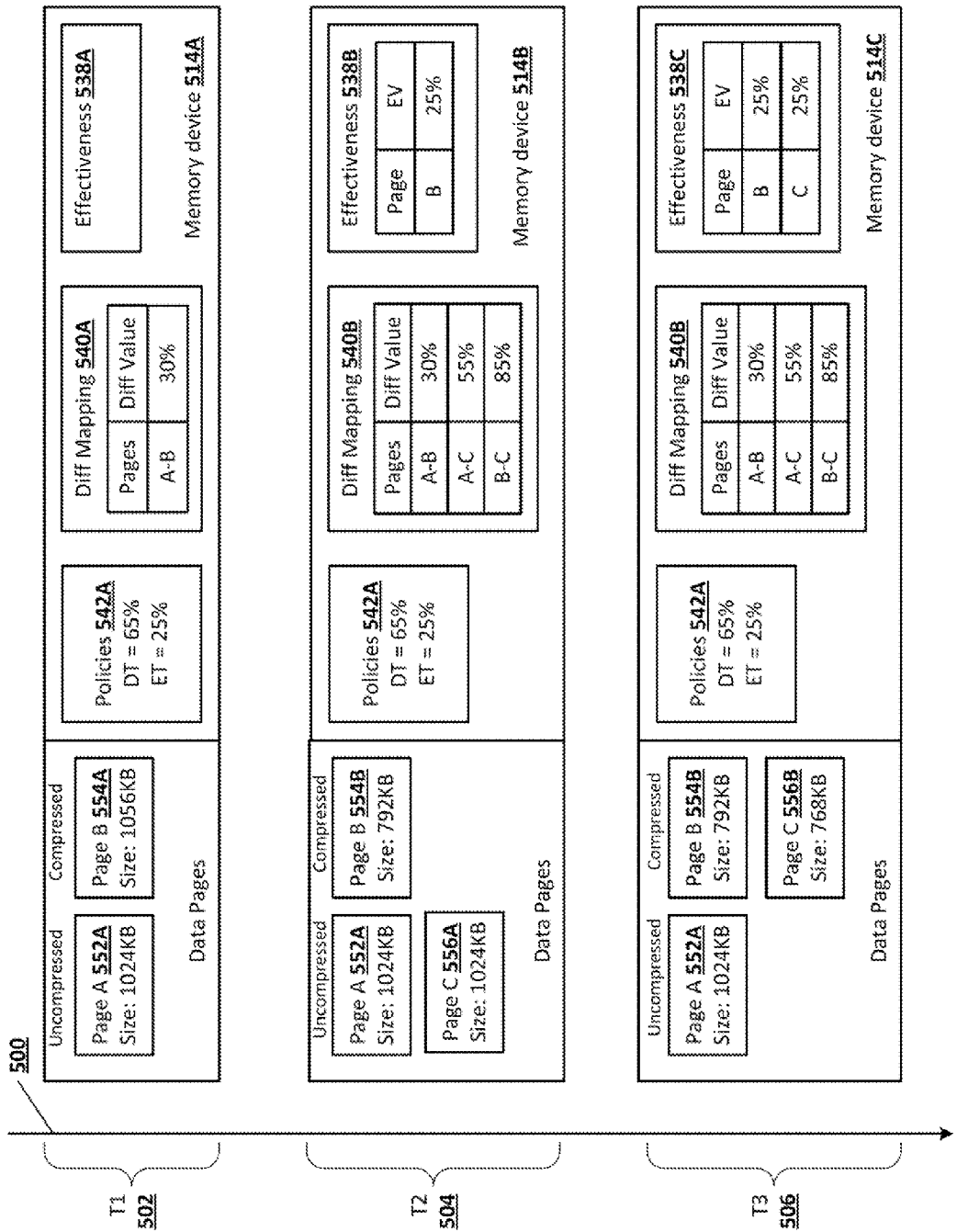
FIG. 5 depicts an example timing diagram of data compression utilizing differential mappings for multiple pages of data, according to one or more embodiments.

FIG. 5 depicts an example timeline 500 of processes performed within example memory device 514 of a data processing system. Timeline 500 consists of three different times, Time T1 502, Time T2 504, and Time T3 506. At each time, a snapshot of contents within memory device 514 is presented. These contents generally consists of pages of data, namely page A 510A, page B 510B, and page C 510C, as well as compression policy 542, differential mapping data structure 540, and effectiveness value data store 538. Those skilled in the art will appreciate that the illustration depicted in FIG. 5 is intended only to provide an example embodiment of the disclosure, and is not necessarily intended to limit the disclosure.

At time T1 502, memory device 514 includes two pages of data, Page A 510A and Page B 512A. For purposes of the example, Page A 510A is indicated to be 1024 KB in size, and Page B 512A is 1056 KB in size. Also, at T1 502, memory device 514A includes compression policy 542A, differential mapping data structure 540A, and effectiveness value data store 138. Compression policy 542A indicates that compression of a similar second page is to occur following the compression of a first page only if (a) the differential value (level of similarity between the two pages) is at least 65% and a compression effectiveness corresponding to the compression of the first page is at least 25%. According to one aspect of the disclosure, compressed pages that yield a compression effectiveness value that meets or exceeds the effectiveness threshold of 25% are determined to be sufficiently compressed such that other pages that are sufficiently similar to that first page should also be compressed. In this example, the first page (e.g., Page A) must be compressed by at least 25% to be considered effectively compressed, and then the second page (e.g., Page B) has to be at least 65% similar in content to trigger an automatic compression of the second page following the compression of the first page. At time T1 502, no compression has occurred, and as such, effectiveness value 538A is empty. However, differential mapping data structure 540A indicates that the differential value (amount of similarity) for Page A 552 compared to Page B 554 (or vice-versa) is only 30%. With differential threshold set at 65%, these two pages are not identified as being similar.

At time T2 504, uncompressed page C 556A has been added to memory device 528B, and compression accelerator 136 has compressed Page B 554B. Page C 556A is 1024 KB in size. Page B 554B has been compressed to 792 KB. Compression accelerator 116 has calculated the compression effectiveness value for Page B 554 as 25% ([1056−792]/1056), and stored the calculated effectiveness value (25%) in effectiveness value 538B. Further, de-duplication module 134 has calculated differential values for Page A 552 and Page C 556 and for Page B 554 and Page C 556. The differential value for Page A 552 and Page C 556 is determined to be 55%, and the differential value for Page B 554 and Page C 556 is determined to be 80%. De-duplication module 134 has stored the calculated differential values in differential mapping data structure 540B.

At time T3 506, compression accelerator 116 has determined that the effectiveness value for Page B 554 (25%) satisfies the effectiveness threshold indicated in compression policy 542A. In addition, compression accelerator 116 has determined that the differential value of 80% for Page B 554 and Page C 556 meets (and exceeds) the differential threshold (65%). Accordingly, as depicted at T3 506, compression accelerator 116 compresses Page C 556B to a size of 768 KB. In response, compression accelerator 116 calculates the effectiveness value for the compression of Page C 556 as 25%, and stores the calculated effectiveness value in compression effectiveness 538C.

While not shown, if at some later time T4, one or both of the effectiveness threshold and/or the differential threshold are modified, the handling of the specific pages in memory 514 can change. For example, a reduction in the differential threshold from 65% to 55% would cause compression accelerator 116 to also compress page A 552A, based on the successful compression of page C 556. As another example, an increase in the compression efficiency threshold from 25% to 30% would result in none of the second pages (A or C) being compressed following the compression of page B at time T2 504.

Figure 6:
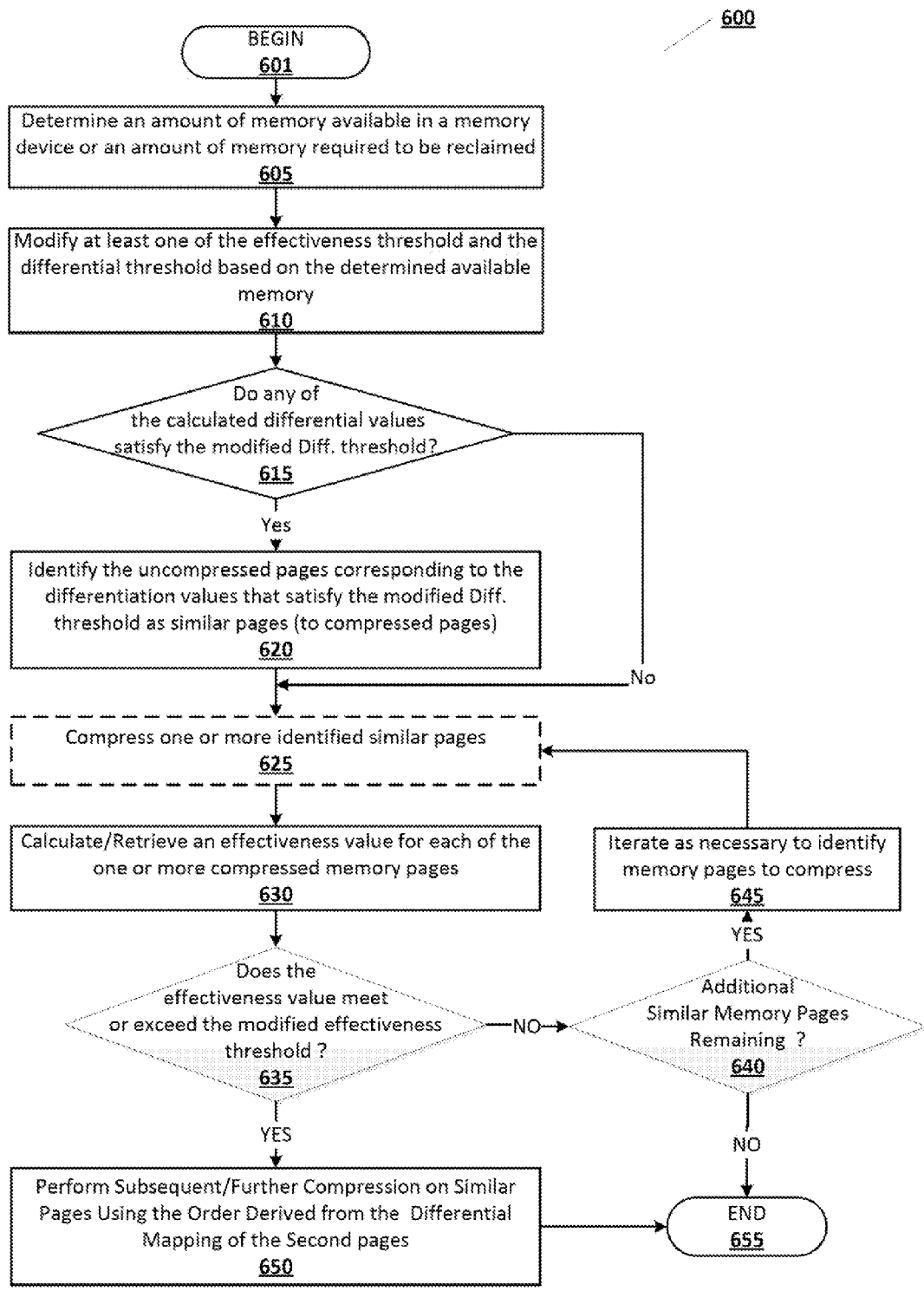
FIG. 6 is a flow chart illustrating a method for performing data compression using an effectiveness value of previous compressions of similar pages, according to one or more embodiments.

As described above, at least one of the pre-set differential parameter threshold and the pre-determined compression effectiveness threshold can be dynamically modified based on an amount of available memory. FIG. 6 illustrates an example method 600 showing how these parameters or thresholds can be dynamically modified in order to optimize storage in a memory device based on policies stored in compression policy 142. Method 600 begins at block 601. At block 605, compression accelerator 136 determines an available amount of memory in memory device 114. In one embodiment, this determination can involve determining how much memory space is needed to be reclaimed. At block 610, compression accelerator 136 modifies one of (a) the compression effectiveness threshold and (b) the differential threshold based on the determined available memory and/or need to reclaim memory space in memory device 114. In one or more embodiments, if there is a large amount of available memory in memory device 128, then compression accelerator 116 modifies one or both of the compression effectiveness threshold and the differential threshold to slow down the rate of page (data) compression. Alternatively, if there is a small amount of available memory in memory device 128, then compression accelerator 136 modifies one or both of the compression effectiveness threshold and the differential threshold to speed up the rate of page (data) compression.

Following the modification to the compression effectiveness threshold and/or the differential threshold, method 600 continues at decision block 615, where compression accelerator 136 determines whether any of the previously calculated differential values satisfy the modified differential threshold. In one or more embodiments, compression accelerator 136 accesses differential mapping structure data store 140 to access the differential values calculated in FIG. 3 or 4. If none of the calculated differential values satisfy the modified differential threshold, then the method proceeds to block 625.

Returning to decision block 615, if compression accelerator 136 determines that any of the calculated differential values satisfy the modified differential threshold, then method 600 continues at block 620. At block 620, compression accelerator 116 identifies the memory pages corresponding to the differential values that satisfy the modified differential threshold as pages that are sufficiently similar to be considered for compression. Specifically, compression accelerator 116 identifies the uncompressed memory pages that are determined (by execution of de-duplication process) to be sufficiently similar to the memory page that, when compressed, satisfies (meets or exceeds) the effectiveness threshold (which may also have been modified).

Method 600 continues at block 625, at which compression accelerator 116 compresses one or more of the uncompressed memory pages identified in block 620. Then, at block 630, compression accelerator 116 calculates a compression effectiveness value for each of the memory pages that were compressed at block 625, and determines at decision block 635 whether the calculated compression effectiveness meets or exceed the modified effectiveness threshold. If the calculated compression effectiveness value does not meet or exceed the modified compression effectiveness threshold, method proceeds to block 640 at which method 600 determines whether additional uncompressed memory pages remain for other pages that were previously compressed but failed to meet the previous compression effectiveness threshold. Method 600 then iterates through all of these other first pages (block 645) to check their calculated compression effectiveness against the new compression effectiveness thresholds. In one or more embodiments, compression accelerator 116 stores, in effectiveness value data store 138, the initially calculated effectiveness values for each first page that is compressed. These values can then be utilized if the compression effectiveness threshold is modified without having to calculate new compression effectiveness values for the uncompressed second pages that are similar to the compressed first page.

Returning to decision block 635, in response to the calculated effectiveness value meeting or exceeding the modified compression effectiveness threshold, compression accelerator 116 performs additional compression on the second pages having similar content using the order/ranking derived from the differential mapping of these second pages (block 650). Method 600 ends at block 655.

In the flow charts above, the various methods can be embodied in computer readable code stored in a computer readable storage device such that the method is performed when the computer readable code is executed by a processor on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or, alternatively, a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following storage devices: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible storage device that can store a program for use by or in connection with an instruction execution system, apparatus, or device.

Alternatively to a computer readable storage medium, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF signals, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for data compression, the system comprising:
a memory storage having a plurality of pages of data stored thereon;
a processor communicatively coupled to the memory storage and which executes program code that enables the system to provide efficient compression of pages of data, the program code when executed by processor configures the processor to:
compress a first page of data of the plurality of pages of data stored in the memory storage, wherein each page of data of the plurality of pages of data has a content stored thereon that can be compressed;
calculate a compression effectiveness of the first page, wherein the compression effectiveness of the first page indicates an amount by which the first page was compressed; and
in response to the calculated compression effectiveness of the first page being at least as high as a pre-determined compression effectiveness threshold:
identify a plurality of second pages of data of the plurality of pages of data stored in the memory storage that have similarities in content with a content of the first page; and
in response to identifying the plurality of second pages, sequentially compress one or more second pages from among the plurality of second pages in an order that is based on a relative ranking of the plurality of second pages according to a differential parameter associated with each of the plurality of second pages, wherein a differential parameter of an second page of the plurality of second pages indicates a level of similarity that exists between the first page and the second page.

2. The system of claim 1, wherein the program code that configures the processor to identify the plurality of second pages further comprises code that configures the processor to execute functions of a memory de-duplication process by configuring the processor to:
compare each page of data within the memory storage with at least the first page to determine the plurality of second pages of data;
in response to identifying the plurality of second pages, compute a differential parameter value for each page of the plurality of second pages;
identify the first page as a root page;
generate and maintain an ordered mapping of the plurality of second pages, wherein the plurality of second pages are arranged sequentially according to a relative size of the differential parameter value computed for each page when compared against the first page;
store the ordered mapping of the plurality of second pages within the memory storage; and access the ordered mapping of the plurality of second pages to determine an order that the one or more second pages should be selected in for compression.

3. The system of claim 1, wherein the program code that configures the processor to identify the plurality of second pages further comprises code that configures the processor to:
   determine, for each of the plurality of second pages, whether a differential parameter value of each of the plurality of second pages is greater than a pre-set differential parameter threshold, wherein the differential parameter value for a page of the plurality of second pages indicates a relative similarity between the content of the first page and a content of that page, wherein the pre-set differential parameter threshold indicates a minimum level of similarity between any two pages that is sufficient to mark the two pages as similar; and
   tag, as similar, only those second pages of the plurality of second pages that have a differential parameter value that is not greater than the pre-set differential parameter threshold.

4. The system of claim 3, the program code further comprising code that configures the processor to:
   dynamically modify a current value of at least one of the pre-set differential parameter threshold and the pre-determined compression effectiveness threshold based on a current amount of available memory, wherein the current value of the differential parameter threshold and the current value of the pre-determined compression effectiveness threshold are decreased in response to the amount of available memory being reduced and increased in response to the amount of available memory increasing.

5. The computer program product of claim 3, wherein the program code for identifying the plurality of pages further comprises code for executing functions of a memory de-duplication process which includes code for:
   comparing each page of data within the memory with at least the first page to determine the plurality of second pages of data;
   in response to identifying the plurality of second pages, computing a differential parameter value for each page of the plurality of second pages;
   identifying the first page as a root page;
   generating and maintaining an ordered mapping of the plurality of second pages, wherein the plurality of second pages are arranged sequentially according to a relative size of the differential parameter value computed for each page when compared against the first page;
   storing the ordered mapping of the plurality of second pages within the memory; and
   accessing the ordered mapping of the plurality of second pages to determine an order that the one or more second pages should be selected in for compression.

6. The system of claim 3, wherein the compression effectiveness of the first page is at least 25% and wherein the pre-set differential parameter threshold is at least 65%.

7. The system of claim 1, wherein the program code that configures the processor to calculate a compression effectiveness further comprises code that configures the processor to calculate a ratio of a difference between an original size of the first page and a compressed size of the first page to the original size of the first page.

8. The system of claim 1, further comprising code that configures the processor to:
   rank each of the plurality of second pages according to a differential parameter value that indicates a relative similarity between the contents of each of the plurality of second pages and the first page; and
   generate at least one differential mapping that comprises stored differential values of pairs of compared pages, wherein the at least one differential mapping is a data structure that indicates a differential value for each page of data in the memory storage compared to every other page of data in the memory storage;
   wherein the plurality of second pages are identified utilizing the at least one differential mapping.

9. The system of claim 8, further comprising code that configures the processor to:
   detect storage of a new page of data in the memory storage; and
   in response to detecting the storage of the new page of data in the memory storage:
      calculate a plurality of new differential values for the new page of data based on a comparison of the new page to a plurality of previously compressed pages of data;
      determine whether any of the plurality of new differential values indicates that the new page of data is sufficiently similar to a compressed page of the plurality of previously compressed pages; and
      place the new page as one of the plurality of second pages within the at least one differential mapping sequentially based on values of the plurality of new differential values relative to the stored differential values of the plurality of second pages within the at least one differential mapping.

10. The system of claim 1, the code further comprising code that configures the processor to:
    calculate the differential parameter value for each of the plurality of second pages; and
    order only the tagged second pages of the plurality of second pages within a mapping that arranges the tagged second pages in a sequence of relative size based on the differential parameter value for each of the tagged second pages.

11. The system of claim 10, wherein the pre-determined compression effectiveness threshold is indicative of a specific desired minimum value of compression effectiveness, the program code further comprising code that configures the processor to:
    compare the calculated compression effectiveness of the first page against the pre-determined compression effectiveness threshold; and
    in response to the calculated compression effectiveness of the first page being at least as high as a pre-determined compression effectiveness threshold:
       retrieve the mapping;
       select at least one second page of the tagged second pages in the mapping that has a lowest differential parameter value;
       perform a subsequent compression on the selected at least one second page; and
       perform a subsequent compression on the tagged second pages in the mapping in a sequence that is based on the order of the tagged second pages within the mapping.

12. A computer program product comprising a computer-readable storage device having stored thereon computer program code that is executable by a processor to providing efficient compression of pages of data, the program code including code for:

compressing a first page of data of a plurality of pages of data stored in a memory, wherein each page of data of the plurality of pages of data has a content stored thereon that can be compressed;

calculating a compression effectiveness of the first page, wherein the compression effectiveness of the first page indicates an amount by which the first page was compressed; and in response to the calculated compression effectiveness of the first page being at least as high as a pre-determined compression effectiveness threshold:

identifying a plurality of second pages of data of the plurality of pages of data stored in the memory that have similarities in content with a content of the first page; and in response to identifying the plurality of second pages, sequentially compressing one or more second pages from among the plurality of second pages in an order that is based on a relative ranking of the plurality of second pages according to a differential parameter associated with each of the plurality of second pages, wherein a differential parameter of an second page of the plurality of second pages indicates a level of similarity that exists between the first page and the second page.

13. The computer program product of claim 12, wherein the program code for identifying the plurality of second pages of data further comprises code for:

determining, for each of the plurality of second pages, whether a differential parameter value is greater than a pre-set differential parameter threshold, wherein the differential parameter value for a page of the plurality of second pages indicates a relative similarity between the content of the first page and a content of that page, and wherein the pre-set differential parameter threshold indicates a minimum level of similarity between any two pages that is sufficient to mark the two pages as similar; and tagging, as similar, only those second pages of the plurality of second pages that have a differential parameter value that is not greater than the pre-set differential parameter threshold.

14. The computer program product of claim 13, the program code further comprising code for dynamically modifying a value of at least one of the pre-set differential parameter threshold and the pre-determined compression effectiveness threshold based on an amount of available memory, wherein the value of the differential parameter threshold and the value of the pre-determined compression effectiveness threshold are decreased in response to the amount of available memory being reduced and increased in response to the amount of available memory increasing.

15. The computer program product of claim 13, wherein the compression effectiveness of the first page is at least 25% and wherein the pre-set differential parameter threshold is at least 65%.

16. The computer program product of claim 12, wherein the program code for calculating a compression effectiveness further comprises program code for calculating a ratio of a difference between an original size of the first page and a compressed size of the first page to the original size of the first page.

17. The computer program product of claim 12, further comprising program code for:

ranking each of the plurality of second pages according to a differential parameter value that indicates a relative similarity between the contents of each of the plurality of second pages and the first page; and generating at least one differential mapping that comprises stored differential values of pairs of compared pages, wherein the at least one differential mapping is a data structure that indicates a differential value for each page of data in the memory storage compared to every other page of data in the memory storage;

wherein the plurality of second pages are identified utilizing the at least one differential mapping.

18. The computer program product of claim 17, further comprising program code for:

detecting storage of a new page of data in the memory; and in response to detecting the storage of the new page of data in the memory:

calculating a plurality of new differential values for the new page of data based on a comparison of the new page to a plurality of previously compressed pages of data;

determining whether any of the plurality of new differential values indicates that the new page of data is sufficiently similar to a compressed page of the plurality of previously compressed pages; and placing the new page as one of the plurality of second pages within the at least one differential mapping sequentially based on values of the plurality of new differential values relative to the stored differential values of the plurality of second pages within the at least one differential mapping.

19. The computer program product of claim 12, wherein the program code for identifying the plurality of second pages of data further comprises code for:

calculating the differential parameter value for each of the plurality of second pages; and ordering only the tagged second pages of the plurality of second pages within a mapping that arranges the tagged second pages in a sequence of relative size based on the differential parameter value for each of the tagged second pages.

20. The computer program product of claim 19, wherein the pre-determined compression effectiveness threshold is indicative of a specific desired minimum value of compression effectiveness, the program code further comprising code for:

comparing the calculated compression effectiveness of the first page against the pre-determined compression effectiveness threshold; and in response to the calculated compression effectiveness of the first page being at least as high as the compression effectiveness threshold:

retrieving the mapping;

selecting at least one second page of the tagged second pages in the mapping that has a lowest differential parameter value;

performing a subsequent compression on the selected at least one second page; and performing a subsequent compression on the tagged second pages in the mapping in a sequence that is based on the order of the tagged second pages within the mapping.

* * * * *